United States Patent [19]

Blanding et al.

[11] Patent Number: 4,774,553

[45] Date of Patent: Sep. 27, 1988

[54] FILM HANDLING MECHANISM

[75] Inventors: Douglass L. Blanding; Shaun M. Amos, both of Rochester; Thomas C. Jessop, Webster, all of N.Y.

[73] Assignee: Eastman Kodak Company, Rochester, N.Y.

[21] Appl. No.: 122,993

[22] Filed: Nov. 19, 1987

[51] Int. Cl.[4] .............................................. G03B 27/62
[52] U.S. Cl. ......................................... 355/75; 355/54
[58] Field of Search ................... 355/75, 76, 38, 40, 355/45, 43, 53, 54

[56] References Cited

U.S. PATENT DOCUMENTS

| | | | |
|---|---|---|---|
| 3,953,123 | 4/1976 | Jesensky | 355/45 |
| 4,452,526 | 6/1984 | Johannsmeier | 355/43 |
| 4,545,674 | 10/1985 | Ishitate et al. | 355/75 |
| 4,575,226 | 3/1986 | Zahn et al. | 355/75 X |
| 4,603,966 | 8/1986 | Brownstein | 355/45 |
| 4,616,926 | 10/1986 | DiPietro et al. | 355/45 |
| 4,645,334 | 2/1987 | Shimada et al. | 355/40 |
| 4,659,213 | 4/1987 | Matsumoto | 355/38 |

*Primary Examiner*—Richard A. Wintercorn
*Attorney, Agent, or Firm*—Jeffrey L. Brandt

[57] ABSTRACT

A film handling mechanism for a photographic printer which has only one surface-to-surface movement, thereby minimizing the number of tolerances to be controlled, and which nevertheless provides for film movement at the gate in all directions in the film plane including rotation, so as to provide unlimited flexibility in positioning a film frame for printing. The mechanism includes a reader for data on the film and four edge clamping of the frame selected for printing, regardless of film orientation and the location of the frame on a filmstrip.

15 Claims, 5 Drawing Sheets

FILM HANDLING MECHANISM

BACKGROUND OF THE INVENTION

1. Field of the Invention

The present invention relates to a film handling mechanism for a photographic printer which provides for film movement at the gate in all directions in the plane of the film, including rotation, but which has only one surface-to-surface movement, thereby minimizing the number of tolerances and the sum of the tolerances between the emulsion surface of the film in the printing position and the surface to which the printer lens is mounted.

2. Description Relative to the Background Art

The nearest prior art known to us is U.S. Pat. No. 4,616,926 issued Oct. 14, 1986 and U.S. Pat. No. 4,603,966 issued Aug. 5, 1986. These patents illustrate one type of printer with which the film handling mechanism of the present invention is useful. In these patents, the mechanisms for locating the film frame to be printed require several relatively moving surfaces, for example, the sliding surfaces of elements 44, 46, and 70 in U.S. Pat. No. 4,616,926. The additive manufacturing tolerances involved in those parts renders manufacturing much more expensive and the results less likely to produce the required sharpness in the final print.

U.S. Pat. No. 4,452,526 discloses a step-and-repeat alignment and exposure system for photometric printing of a reticle upon a semiconductive wafer, using multiple stages and plural axes of motion and rotation.

U.S. Pat. No. 3,953,123 issued Apr. 27, 1976 discloses a transport mechanism for successively positioning micro-images disposed on one of two film cards in an illumination path of a viewer printer. The film cards are mounted between glass plates which are movable by motor driven cable and spring arrangement forward and sideways.

Cropping is a photographic printing technique in which a photofinisher effectively eliminates a portion of a photographic original, e.g. color negative film image, in order to print only a specific portion of the original image. For example, only a corner portion or a central area of the entire image may be printed. It is also desirable at times to rotate the image for printing in order to correct for camera tilt when the original exposure was made, or to better utilize the particular dimension of the printing paper on which the image is to be printed. For example, if an 11×14 inch print is to be made on 11 inch wide paper, it may be necessary to orient the negative so that its long dimension runs lengthwise of the paper. Thus the orientation of the negative (horizontal or vertical) would be aligned with or opposite to the orientation of the paper.

GENERAL DESCRIPTION OF THE INVENTION

The prior art referred to above discloses printers in which the negative may be moved along orthogonal X and Y axes in a horizontal plane and also rotated in that plane for the cropping purposes described. However, in order to achieve these movements, the prior art mechanisms utilized a number of relatively moving stages such as stages 44, 46 and 70 of FIG. 4 of U.S. Pat. No. 4,603,966. The large number of tolerances involved in the multiple contacting surfaces of such stages and the sum of all of these tolerances between the film in the printing position and the printing lens, resulted in unduly high manufacturing costs and difficulty in achieving the required precision.

The present invention provides a mechanism which accomodates all of the necessary film movements but has only one surface-to-surface movement between the clamped film and the base which supports the lens. This ingenious mechanism thus enormously reduces the manufacturing problems and increases precision.

This breakthrough in film gate mechanism design is accomplished by providing a base which carries the printing lens. The base has an opening aligned with the optical axis of the lens, and has a flat upper bearing surface which is one of the two relatively moving surfaces of the apparatus. Slidable on that upper surface is the bottom surface of a slider pad which will move in all X and Y directions along the surface of the base. The slider pad has a central opening locatable over the opening in the base. The pad carries film guideway means which has an opening over the opening in the pad constituting the film gate at which a negative is positioned for printing. Novel film clamping means are provided at the gate.

The base carries a plurality of bearing wheels which support a carrier member which rotates about the base. A reversible motor rotates the carrier relative to the base. An ingenious arrangement of motors, pulleys and cables supported by the carrier member effects movement of the film guideway means as the lower surface of the pad, to which the guideway means is fixed, slides on the upper surface of the base. The film guideway means carries those elements closely related to the film, including film driving belt means operated by a motor carried by the film guiding means, the film clamping mechanism, and film code reading means.

GENERAL DESCRIPTION OF THE DRAWINGS

The invention will be readily understood by reference to the appended drawings, in which.

DETAILED DESCRIPTION OF THE INVENTION

Film Guideway Mechanism

Figure 1:
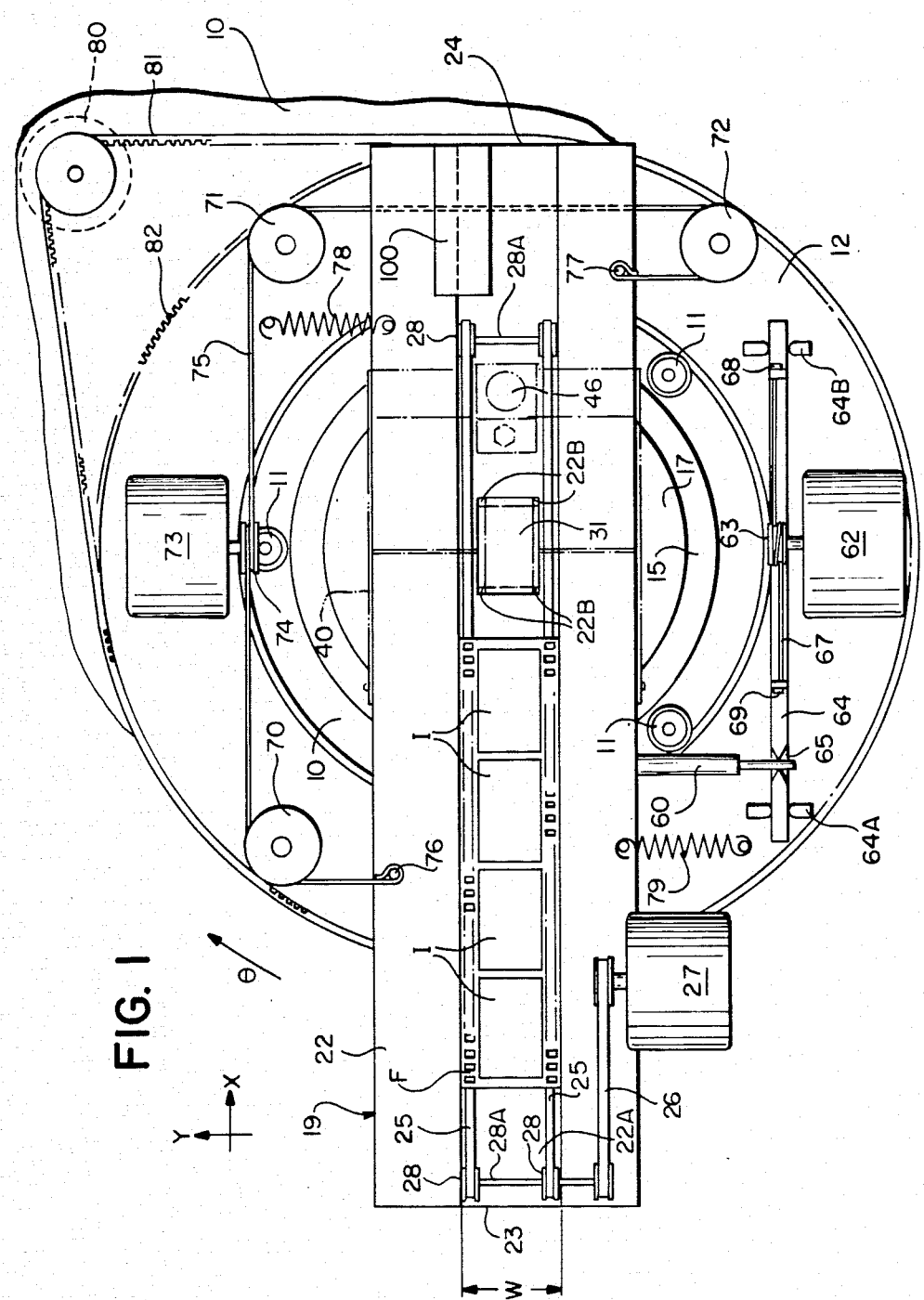
FIG. 1 is a top plan view of apparatus according to the invention.
Figure 2:
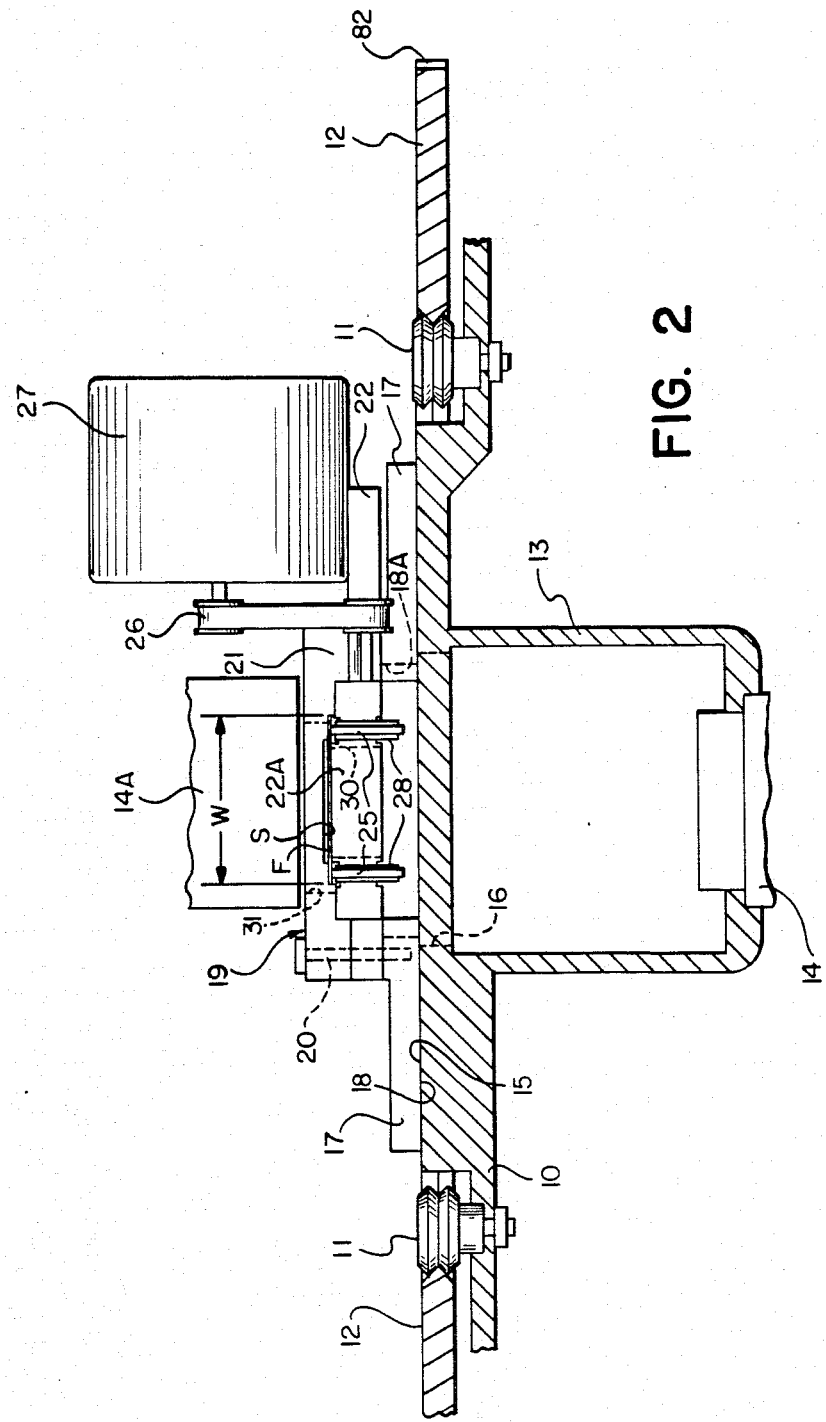
FIG. 2 is an end elevational view, partly in section looking from the film entry direction.
Figure 6:
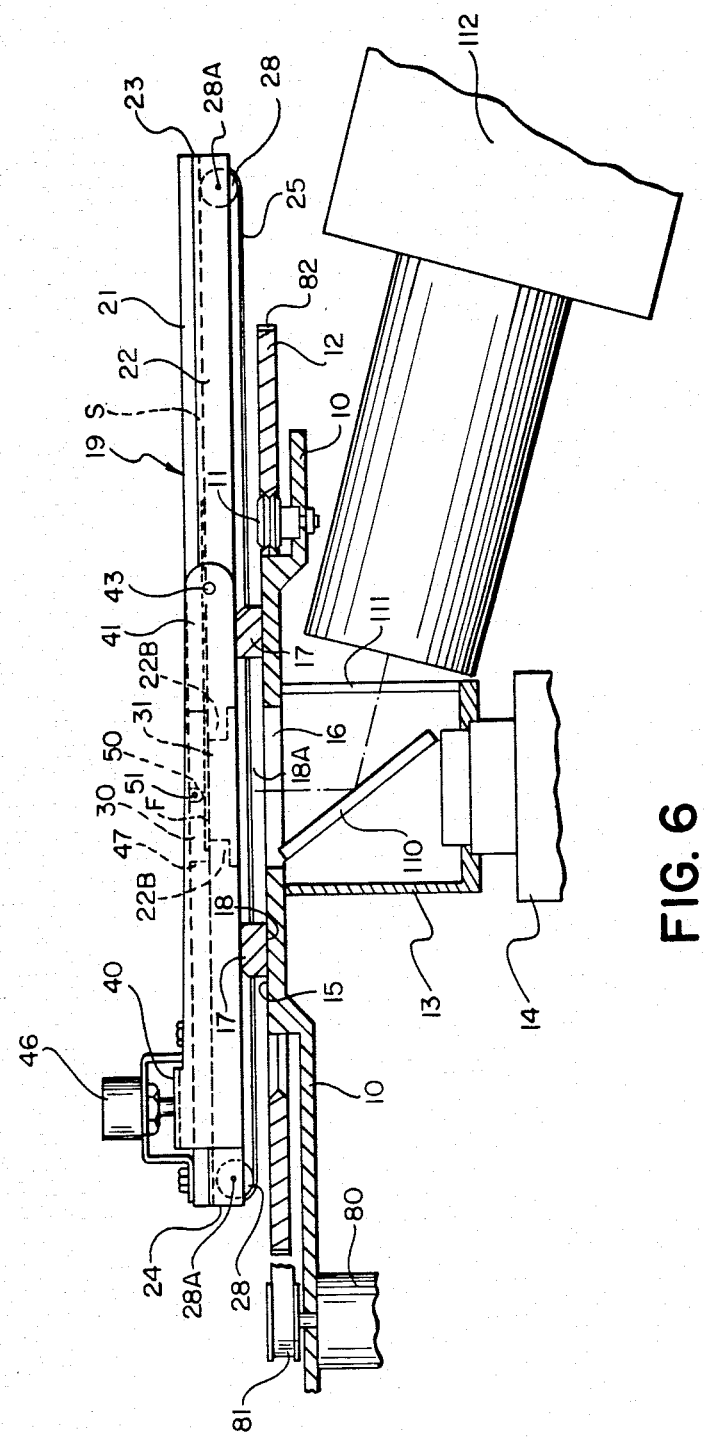
FIG. 6 is a side elevational view, partly in section, showing the base supporting the pad, lens and guideway means, and with the film advanced to position an image in the gate.

Referring now to FIGS. 1, 2 and 6, a base is shown at 10. It is generally circular and carries a plurality of, preferably three, bearing wheels 11 which rotatably support an annular carrier member 12. The bottom portion of the base carries a lens mount 13. A lens, usually of the zoom type, is indicated at 14. A printing light source is indicated at 14A. The upper surface 15 of the base is flat and has a central opening 16 over the lens. A slider pad or bearing element 17 has a flat bottom surface 18 which slides on the upper surface 15 of the base. These surfaces are dry lubricated, as by "Teflon" impregnation, to facilitate sliding. As will be apparent below, the bearing surfaces 15, 18 comprise the only moving surfaces between the clamped film and the lens. Pad 17 has a central opening 18A, best seen in FIGS. 2 and 6, which is slightly larger in diameter than opening 16 in the base.

As shown in FIG. 2, pad 17 supports elongated film guiding means 19 which is fixed to the pad by screws, one of which is shown at 20. Film guiding means 19 comprises upper section 21 and lower section 22, these sections being secured together and to pad 17 with screws 20. (For purposes of illustration, in FIG. 1, film handling mechanism 10 is shown with cover 21 removed.) Optionally, pad 17 and film guide lower section 22 can comprise a unitary casting. Lower section 22 defines a rail-like structure, indicated at 22A, for supporting drive wheels and belts (described below) spaced equi-distance to the edge perforations of a 35 mm filmstrip.

Upper section 21 of guideway means 19 is cover like. Both upper section 21 and lower section 22 extend from a film entry location indicated at 23 in FIGS. 1 and 6, to an opposing lateral edge indicated at 24. Upper guideway section 21 and lower guideway section structure 22A together define a thin, elongate rectangular space indicated at S. Space S has a width W slightly wider than the width of a 35 mm filmstrip, indicated at F, and extends the length of filmstrip guideway 19. A pair of film moving belts 25 are located in space S, and wrapped around substantially the length of structure 22A of guideway section 22. These belts support the outer edges of the sprocket hole portions of the film F and are driven by a belt and pulley arrangement 26 from reversible motor 27 which is mounted on guideway structure 22. Pulleys 28 about which belts 25 run are journaled in lower section 22A by axles 28A. Filmstrips bearing 1 to 4 film frames are fed into this mechanism for printing and are moved through the guideway carried by the belts 25 under the control of motor 27. As will be appreciated from a consideration of the dimensions described above, filmstrip 22 is generally guided by the edges of space S. Belts 25 engage filmstrip 22 in a friction engagement, sandwiching the perforated filmstrip edges against the inside surface of guide upper section 21.

At a location over the opening 18a in pad 17, guideway structures 21, 22 define two registered openings 30, 31, respectively. These openings 30, 31 match closely the dimensions of the picture area of a film frame and constitute the film gate. Film moving along the guideway on belts 25 is halted with a film frame at this position for printing. As is visible in FIGS. 1 and 6, guideway lower structure 22 includes small projections 22B into opening 31 for coacting with a film clamp to secure the film frame in the gate. Belts 25 lie just outside opening 31 and have sufficient freedom of downward movement into an underlying channel defined in guideway lower structure 22A such that they do not interfere with film flatness, nor interpose any variable when the film is clamped in the gate for printing.

Figure 5:
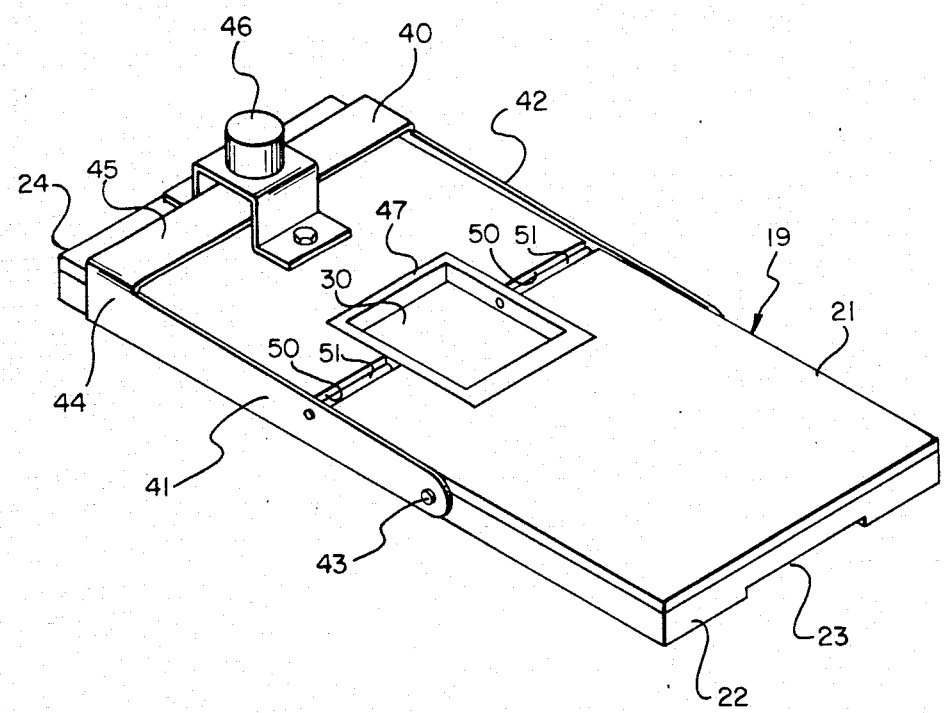
FIG. 5 is a perspective view of the film clamping mechanism.

A film clamping mechanism 40 is shown in dashed line in FIG. 1 and in more detail in FIG. 5. This mechanism includes a pair of lever arms 41, 42, each being hinged at 43 into guideway structure 22 between opening 30 and the film entry location 23. The lever arms are located on each side of guideway structure 21 with their opposing ends 44 positioned between opening 30 and the guideway edge 24. Ends 44 are connected by a cross member 45 which is controlled by a solenoid 46 mounted on guideway structure 21.

Intermediate their ends 43 and 44, lever arms 41 and 42 rigidly support a frame like clamp 47 which is dimensioned to fit into opening 30 and to clamp the film against the projecting portions 22A of lower guideway structure 22 which defines opening 31. The clamp is dimensioned such that it snugly engages opening 31, covering a minimum of the outer edges of the filmstrip F, and clamping the filmstrip firmly in the gate for printing. Upper guideway structure 21 has two grooves 50 which receive rods 51 which connect lever arms 41 and 42 to frame 47. Belts 25 are sufficiently compliant that they are pushed out of the way by clamp 47 when it moves into the clamping position.

Having described the film guideway structure and the manner in which it is supported, the construction by which the guideway structure is moved for cropping and rotation of the printed image will now be described. Movement in a direction parallel to the film feed direction will be referred to as the X coordinate and movement in the plane of the film at 90 degrees to the X coordinate will be referred to as the Y coordinate.

Mechanism For Movement In The X Coordinate

Movement in both X and Y coordinates, as well as rotation of the film in the guideway, is carried out by moving the guideway 19 and pad 17 with sliding movement only of surface 18a on surface 15. No other sliding surfaces are involved.

Figure 3:
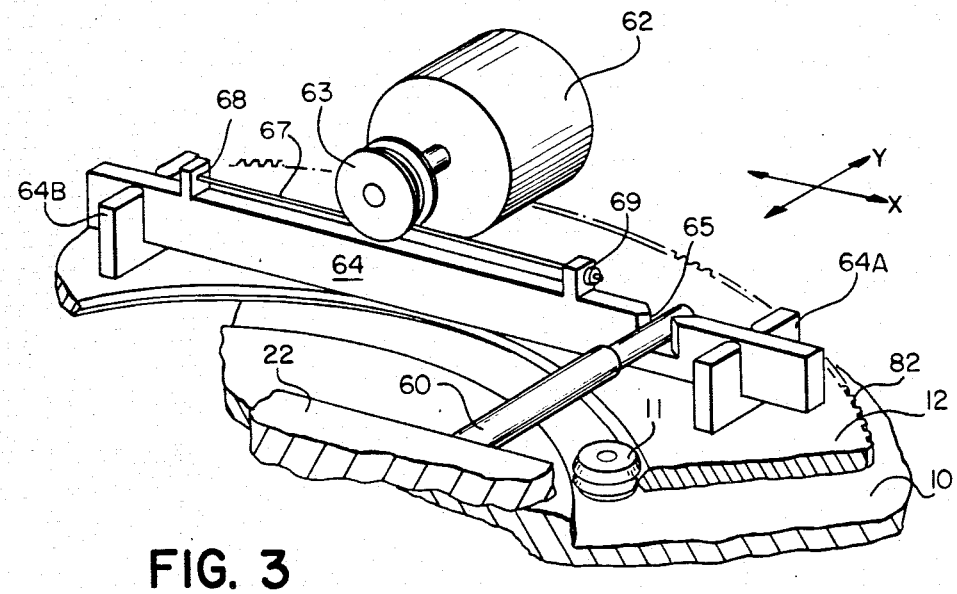
FIG. 3 is a detail perspective view of the capstan, bar, and cable arrangement for moving the film guideway means in the X coordinate.
Figure 4:
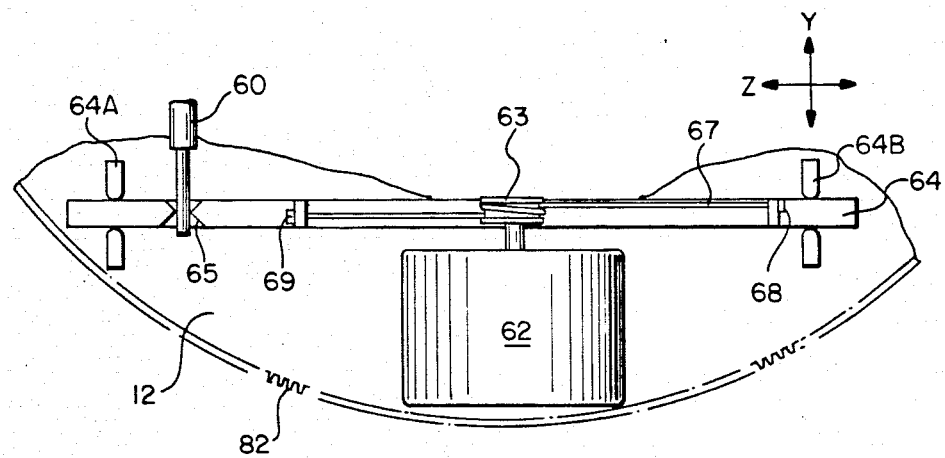
FIG. 4 is an elevational view of the construction shown in FIG. 3.

Mechanism for movement in the X coordinate is shown in FIGS. 1, 3 and 4. A projection 60, extending in the Y coordinate direction, is carried by guideway section 22 of film guideway structure 19. Projection 60 is spaced in the film entry direction from gate opening 30, and, for convenience of description, will be referred to as being located on the right side of guideway structure 21. In a normal position, that is when the mechanism is positioned to print to a full film frame without any rotation or cropping, a motor 62 mounted on carrier member 12 is located on the right side of guideway 19 opposite the film gate. Motor 62 drives a capstan 63. A bar 64 is located below the capstan and generally tangentially thereto. One end of bar 64 has a notch 65 slidably receiving projection 60. This connection thus causes longitudinal motion of the bar to be imparted to projection 60 and to guideway structure 21 while still permitting movement of projection 60 and guideway structure 21 in the Y coordinate. A section of cable 67 is coiled around capstan 63 and has its ends attached to bar 64 at locations 68 and 69 on opposite sides of the capstan. Guides 64a and 64b are mounted on carrier 12 and support bar 64 for reciprocating movement in the X coordinate.

Motor 62 is reversible. It will be seen that rotation of the motor in one direction will move bar 64 via cable 67, and hence guideway structure 19 via the pin/slot connection 60, 65 in one X direction with respect to carrier 12. Rotation of motor 62 in the other direction will move guideway structure 19 in the opposite X direction, at the same time moving pad surface 18 along base surface 15. The single sliding connection between guideway structure 19 and bar 64 at 60, 65 permits movement of guideway structure 21 in the Y coordinate in the manner described below.

Mechanism For Movement In The Y Coordinate

As shown in FIG. 1, three pulley wheels 70, 71 and 72 are supported by carrier 12. Pulley 72 is located on the right side of guideway structure 21 and is more remote in the X coordinate from opening 30 than is solenoid 46. Pulley 71 is located across from pulley 72 on the left side of guideway structure 21. Pulley 70 is located on the left side of guideway structure 21, but is spaced toward the film entry location 23 from opening 30. A reversible motor 73 is mounted on carrier 12 and in the normal position is located substantially midway between pulleys 70 and 71.

Motor 73 drives a capstan 74 about which is wrapped a cable 75. One section of the cable passes from the capstan 90 degrees around pulley 70 to attachment to guideway structure 21 at 76. On the other side of capstan 74, the cable passes 90 degrees around pulley 71 and then to the right side of guideway structure 21, where it passes 180 degrees around pulley 72 to attachment to guideway structure 21 at 77. Tension spring 78 is located on the left side of guideway structure 21 and is connected to carrier 12 and guideway structure 21 so as to work in opposition to the cable attached at 77. A second tension spring 79 on the right side of guideway structure 21 is attached to carrier 12 and to guideway structure 21 so as to work in opposition to the cable attached at 76.

It will be seen that rotation of motor 73 in one direction exerts a pull at 76 and relaxes the pull at 77, moving guideway structure 21 sideways (Y coordinate) as one of springs 78, 79 aids in such movement. Rotation in the opposite direction similarly causes movement of guideway structure 21 in the opposite direction in the Y coordinate. It will be appreciated that this mechanism provides the Y coordinate motion with no rotation of guideway 19 in the X, Y coordinate plane.

Mechanism For Rotation About the Optical Axis (Theta Coordinate)

As shown in FIGS. 1, 2, and 6, and described above, carrier member 12 is rotatably carried by base 10 on wheels 11. Further, the mechanisms described above for moving guideway structure 21 in the X and Y coordinates are also mounted on carrier 12. It will thus be appreciated that rotation of carrier 12 causes rotation of the guideway structure 19 and the filmstrip mounted in openings 30, 31. This rotation is accomplished by means of a reversible motor 80 mounted on an extension of base 10 (FIG. 6). As shown in FIG. 1, motor 80 drives a notched belt 81 which in turn drives a toothed gear 82 disposed about the periphery of carrier 12.

Bar Code Reader

As shown in FIG. 1, the film handling mechanism also includes a reader for bar code or other data carried by the edge of the film to indicate the type of film and the like. A reader of the conventional type is shown at 100, being carried by guideway structure 21 so that it is always in position to read the code, regardless of the orientation of the film guideway. An LED emitter (not shown) is part of the reader 100 and is located below the film to direct light through openings (not shown) in guideway sections 21, 22 and into the sensor. As shown, code reader 100 is positioned beyond the end of belts 25, extending in the X direction so as to read bar-code data normally encoded between the filmstrip perforations and the filmstrip edges. Since all frames of each filmstrip would contain the identical code, the first frame on a strip is transported past the gate to a position appropriate for reading by the reader, and then back to the gate for printing of all selected frames on the strip.

Camera Mounting Mechanism

As shown in FIG. 6, a beam splitter 110 is optionally mounted between lens 14 and opening 16 in lens mount 13. A video camera 112 is positioned to one side of lens mount 13, and optionally secured to the mount, to receive an image of the negative at the gate through opening 111 in the lens mount. This permits the user of the apparatus to view the picture on a CRT before printing to make sure the cropping etc. is as desired. FIG. 6 further shows film F advanced to position an image in the gate defined by apertures 30, 31 as they overlie apertures 16, 18A.

Wiring for supplying power to the various motors and code reader is supplied from above the mechanism so that it is free to move as required in the operation of the various movements of the carrier.

Operation

In operation, a strip of film F having up to four images or film frames I is fed by hand into the entry end 23 of the guideway formed by parts 21, 22 and belts 25, that is, the left end as seen in FIG. 1. Film clamp 40 is in the unclamped or open position.

Motor 27 is actuated to drive belts 25 to move the strip along the guideway until the edge code on the first frame I is read by the code reader 100. A film frame I selected for printing is then moved into the gate defined by registered openings 30, 31. If code reading is not desired, the selected film frame is moved directly to the gate.

If a full frame, uncropped print is desired, the print is made with the guideway structure in the normal position (i.e. the position shown in FIGS. 1-6). If it is desired to move the film in the X coordinate, motor 27 is actuated to drive the film on tracks 25. If it is desired to move the film in the Y coordinate, motor 73 is operated to move the guideway 21 in one direction or the other. If rotation of the film is desired, motor 80 is operated to rotate the guideway in the selected direction.

With the film frame I to be printed positioned at the desired location in the gate, the clamp 40 is moved to the clamping position shown in FIG. 5 by actuation of solenoid 46. (Pneumatic means could alternatively be used in place of solenoid 46). In this clamping position, the film frame in the gate is clamped securely against projections 22B on guideway structure 22, with the drive belts 25 depressed into grooves on the guideway structure. Because guideway structures 21, 22 are secured to base 17, it will be seen that the only moving surfaces are the bearing surfaces 15, 18. Subsequently, the selected film image I can be cropped using video camera 112, and a print of the cropped film image can be made using using a photographic printer employing lens 14.

The mechanism shown in FIGS. 3 and 4 is used to obtain movement in the X coordinate when the last film frame in a strip reaches the gate. If it is desired to move that last negative farther in the X coordinate in order to locate a trailing end portion of that negative on the optical axis of the printing lens, movement of the trailing edge of the strip into the gate would prevent four edge clamping of that negative, as a portion of the filmstrips rear edge would be within the gate opening. In order to assure four edge clamping for the last negative in a strip, that negative is moved squarely into the gate by belts 25, whereupon it is clamped in the gate by the mechanism 40 as described above. Motor 62 is then actuated to move the entire guideway structure 21, with the negative clamped at all four edges in the gate, in the X coordinate until the desired positioning of the negative is reached. When printing is complete, motor 27 is actuated to back filmstrip F out of carrier 19 through entry position 23.

There is thus provided a film handling mechanism which accomodates X and Y translational movement, and theta rotational movement, of a gated film frame while having only one moving bearing surface between the film frame and a mount for securing a photographic lens. The distance between the film frame and the photographic lens is thus controllable to an extremely close tolerance, while ample freedom is provided for positioning the film frame as desired for printing. The film handling mechanism provides four edge clamping of the gated film frame to even more closely control the distance between the film frame and the photographic lens. The film handling mechanism further provides a code reader, such as a bar code reader, for reading codes on the film strip.

The film handling mechanism provided herein has particular application, for example, in an enlarging, cropping, photographic printer. One example of such a printer is shown in U.S. Pat. No. 4,616,926, assigned to the assignee of the present invention.

While the invention has been described with reference to a preferred embodiment, it will be appreciated that various modifications may be effected within the ordinary skill in the art without departing from the scope of the invention.

What is claimed is:

1. A filmstrip handling mechanism for a photographic printer, comprising:
    a base having a flat upper bearing surface and an opening therethrough;
    a bearing element having an opening locatable over the opening in the base, said bearing element having a flat bottom surface slidably supported by the flat upper surface of the base;
    filmstrip guideway means fixed to and carried by said bearing element for defining a film gate opening located over the opening in the bearing element;
    means for moving film along the filmstrip guideway means in a first direction to position a selected film frame in the film gate opening;
    means for moving the filmstrip guideway means transversely of said first direction for sideways film movement; and
    means for rotating the filmstrip guideway means in the plane of the film.

2. Apparatus as set forth in claim 1, said means for rotating comprising a carrier member supported by and rotable about said base, said carrier member supporting said means for moving the filmstrip guideway means transversely of said first direction.

3. Apparatus as set forth in claim 1, said means for moving film along said guideway means comprising at least one belt carried by said guideway means, and a motor carried by said guideway means for driving said belt.

4. Apparatus as set forth in claim 2, said means for moving said filmstrip guideway means transversely to said first direction comprising a motor mounted on said carrier and connected to said guideway means by a cable, and said rotating means including a motor fixed relative to said carrier.

5. Apparatus as set forth in claim 2, and further comprising means mounted on said carrier and connected to said filmstrip guideway means for moving the filmstrip guideway means parallel to said first direction.

6. Apparatus as set forth in claim 1, and further comprising means attached to said base for mounting a printer lens in alignment with said openings and film gate.

7. Apparatus as set forth in claim 1, for use with a filmstrip having data along an edge portion, and further comprising means carried by said guideway means for reading said data.

8. Apparatus as set forth in claim 1, and further comprising film clamping means carried by said guideway means for clamping a selected frame of the filmstrip in the gate.

9. Apparatus as set forth in claim 8 wherein said film clamping means comprises:
    a pair of spaced lever arms hinged to an upper portion of said filmstrip guideway means;
    a film clamp supported by and between said lever arms in alignment with the gate; and
    power means carried by said filmstrip guideway means for operating said lever arms to move said film clamp into the gate to clamp the film for printing, and to move said clamp out of the gate to release the film for movement along said guideway means.

10. A filmstrip handling mechanism for a photographic printer, comprising:
    a base having a flat upper bearing surface disposed substantially horizontally and having an opening therethrough;
    a carrier member supported by and rotatable around said base;
    a bearing element having an opening locatable over the opening in the base, said bearing element having a flat bottom surface slidably supported by the flat upper surface of said base;
    elongated filmstrip guideway means fixed to and carried by said bearing element, said guideway means having an opening located over the opening in said bearing element and constituting a film gate;
    belt means carried by said guideway means for engaging filmstrip edge portions to move a filmstrip along said guideway means in a first direction from a film entry location to the film gate;
    a first electric motor mounted on said guideway means to drive said belt means;
    film clamping means carried by said guideway means for clamping the film at the gate;
    means for moving said guideway means parallel to said first direction for final positioning of the film prior to printing, said means for moving comprising a second electric motor which is reversible and is mounted on said carrier member to one side of said guideway means, a projection extending from said guideway means to said one side of said guideway means, said projection being spaced in the film entry direction from the gate, said second electric motor normally being located substantially opposite the gate, a capstan driven by said second electric motor, a bar located below said capstan and extending substantially tangentially thereto, a first end of said bar being connected to said first projection such that longitudinal movement of said bar causes movement of said projection parallel to said first direction while permitting movement of said projection relative to the bar transversely of said first direction, a cable passing about the capstan and connected at both ends to said bar on opposite sides of said capstan, said bar and cable normally extending parallel to said first direction;

means for moving said filmstrip guideway transversely of said first direction for sideways film movement, said means comprising a third electric motor which is reversible and is mounted on said carrier member to the side of the guideway means opposite to the side on which said second motor is located, a capstan driven by said third motor, a first pulley mounted on said carrier member on the same side of said guideway means as said third motor and spaced from said third motor in the film entry direction, a second pulley mounted on said carrier member on the same side of said guideway means as said first pulley but spaced from said third motor in a direction opposite the film entry direction, a third pulley mounted on said carrier member on the opposite side of said guideway means from said third motor and directly across from said second pulley, a cable passing about said capstan and having a first section passing 90 degrees around said first pulley and then attached to said guideway means, a second section of said cable on the other side of the capstan passing 90 degrees around said second pulley, then to the other side of said guideway means, then 180 degrees around said third pulley and then attached to said guideway means, a first tension spring attached to the carrier member and to said guideway means to work in opposition to said second section of said cable, and a second tension spring attached to said carrier member and to said guideway means to work in opposition to said first section of said cable, said cable sections between said first and second pulleys normally extending parallel to said first direction, said first and second pulleys normally being substantially equidistant from said capstan; and reversible electric motor means for rotating said carrier member about said base.

11. Apparatus as set forth in claim 10, wherein said film clamping means comprises:

a pair of spaced lever arms extending in said first direction and hinged to respective edge portions of said guideway means at locations spaced from said gate;

a frame-like film clamp supported by and between said lever arms in alignment with the gate so as to move into and out of clamping relation with film at the gate upon movement of said lever arms about their respective hinges; and power means carried by said guideway means and spaced from the gate in the opposite direction to said hinge locations, said power means being connected to said lever arms to move them to the film clamping position for printing and away from the film clamping position to free the film for movement along said guideway means.

12. Apparatus according to claim 10 for use with a filmstrip having data associated with the respective film frames, and further including means carried by said guideway means for reading said data.

13. Apparatus as set forth in claim 10, said base having a mount below said opening in the base to receive a printing lens whose optical axis is aligned with said opening.

14. Apparatus as set forth in claim 10, said base having a plurality of bearing wheels mounted about its outer periphery, said carrier member being flat and annular and positioned for support by and rotation about said bearing wheels, and said reversible electric motor means for rotating said carrier member being fixed to said base.

15. Film clamping means for a photographic printer in which a strip of film to be printed is moved along a guideway to a printing gate, comprising a pair of spaced lever arms each hinged at one end along and on opposite sides of said guideway at locations spaced from the gate in a first direction, a frame-like film clamp supported by and between said lever arms in alignment with the gate so as to move into and out of clamping relation with film at the gate upon movement of the lever arms about their respective hinges, and power means spaced from said gate in a direction opposite to said first direction and connected to said lever arms to move them and said clamp to the film clamping position for printing and away from said position to free the film for movement along the guideway.

* * * * *